(12) United States Patent
Shi et al.

(10) Patent No.: US 8,773,402 B2
(45) Date of Patent: Jul. 8, 2014

(54) STYLUS HAVING LENS MEMBER

(75) Inventors: Zheng Shi, Shenzhen (CN); Guo-Wu Jiang, Shenzhen (CN)

(73) Assignees: Shenzhen Futaihong Precision Industry Co., Ltd., Shenzhen (CN); FIH (Hong Kong) Limited, Kowloon (HK)

(*) Notice: Subject to any disclaimer, the term of this patent is extended or adjusted under 35 U.S.C. 154(b) by 492 days.

(21) Appl. No.: 13/095,012

(22) Filed: Apr. 27, 2011

(65) Prior Publication Data

US 2012/0262428 A1 Oct. 18, 2012

(30) Foreign Application Priority Data

Apr. 18, 2011 (CN) .......................... 2011 1 0095429

(51) Int. Cl.
*G06F 3/041* (2006.01)
*G06F 3/0354* (2013.01)

(52) U.S. Cl.
CPC ............ *G06F 3/03545* (2013.01); *G06F 3/041* (2013.01); *G06F 2203/0331* (2013.01)
USPC ...................................... 345/179; 178/19.01

(58) Field of Classification Search
USPC ........................................ 345/179; 178/19.01
See application file for complete search history.

(56) References Cited

U.S. PATENT DOCUMENTS

| 3,955,884 | A | * | 5/1976 | Del Pesco, Sr. ............... 359/804 |
| 6,249,277 | B1 | * | 6/2001 | Varveris ......................... 345/179 |
| 6,910,821 | B1 | * | 6/2005 | Smith .............................. 401/8 |
| D610,145 | S | * | 2/2010 | Smith ......................... D14/411 |
| D616,447 | S | * | 5/2010 | Smith ......................... D14/411 |
| D639,808 | S | * | 6/2011 | Smith ......................... D14/411 |
| 2008/0210724 | A1 | * | 9/2008 | Geis et al. ..................... 224/217 |
| 2009/0078478 | A1 | * | 3/2009 | Newman .................... 178/19.01 |
| 2009/0115643 | A1 | * | 5/2009 | Goffman ........................ 341/22 |
| 2010/0188326 | A1 | * | 7/2010 | Dines ............................ 345/156 |
| 2011/0273406 | A1 | * | 11/2011 | Brailey ........................ 345/179 |
| 2012/0170962 | A1 | * | 7/2012 | Nwapa-Jourdan et al. ........ 401/8 |

FOREIGN PATENT DOCUMENTS

JP   2001091863 A * 4/2001 ............. G02B 25/00

* cited by examiner

*Primary Examiner* — Adam J Snyder
(74) *Attorney, Agent, or Firm* — Novak Druce Connolly Bove + Quigg LLP

(57) ABSTRACT

A stylus for a portable electronic device includes a main body, a nib, and a lens member. A through hole runs through two ends of the main body. The nib and the lens member are rotatably connected to the main body.

7 Claims, 5 Drawing Sheets

STYLUS HAVING LENS MEMBER

CROSS-REFERENCE TO RELATED APPLICATIONS

This application is one of the three related co-pending utility patent applications and three allowed design patent applications listed below. All listed patent applications have the same inventors and assignee. All listed utility patent applications are concurrently filed herewith. The disclosure of each of the listed applications is incorporated by reference into all the other listed applications.

| Attorney Docket No. | Ser. No. | Title | Inventors | Current Status |
|---|---|---|---|---|
| US37121 | 29/380,862 | STYLUS HAVING FONT MAGNIFIER | Zheng Shi et al. | Notice of Allowance received |
| US37122 | N/A | STYLUS | Zheng Shi et al. | N/A |
| US37915 | 29/383,733 | STYLUS HAVING FONT MAGNIFIER | Zheng Shi et al. | Notice of Allowance received |
| US37916 | N/A | STYLUS | Zheng Shi et al. | N/A |
| US37917 | N/A | STYLUS | Zheng Shi et al. | N/A |
| US37918 | 29/383,734 | STYLUS HAVING FONT MAGNIFIER | Zheng Shi et al. | Notice of Allowance received |

BACKGROUND

1. Technical Field

This disclosure relates to a stylus for portable electronic devices.

2. Description of Related Art

Styluses are often used with touch screens of electronic devices. A stylus may include a main body and a nib portion formed at one end of the main body, and be configured for being comfortably held and used by an average user. However, the typical pen-like configuration is often difficult for certain types of users to accurately use, such as users with vision deficiencies.

Therefore, there is room for improvement within the art.

BRIEF DESCRIPTION OF THE DRAWINGS

Many aspects of the stylus can be better understood with reference to the following drawings. The components in the drawings are not necessarily drawn to scale, the emphasis instead being placed upon clearly illustrating the principles of the multifunctional case.

DETAILED DESCRIPTION

Figure 1:
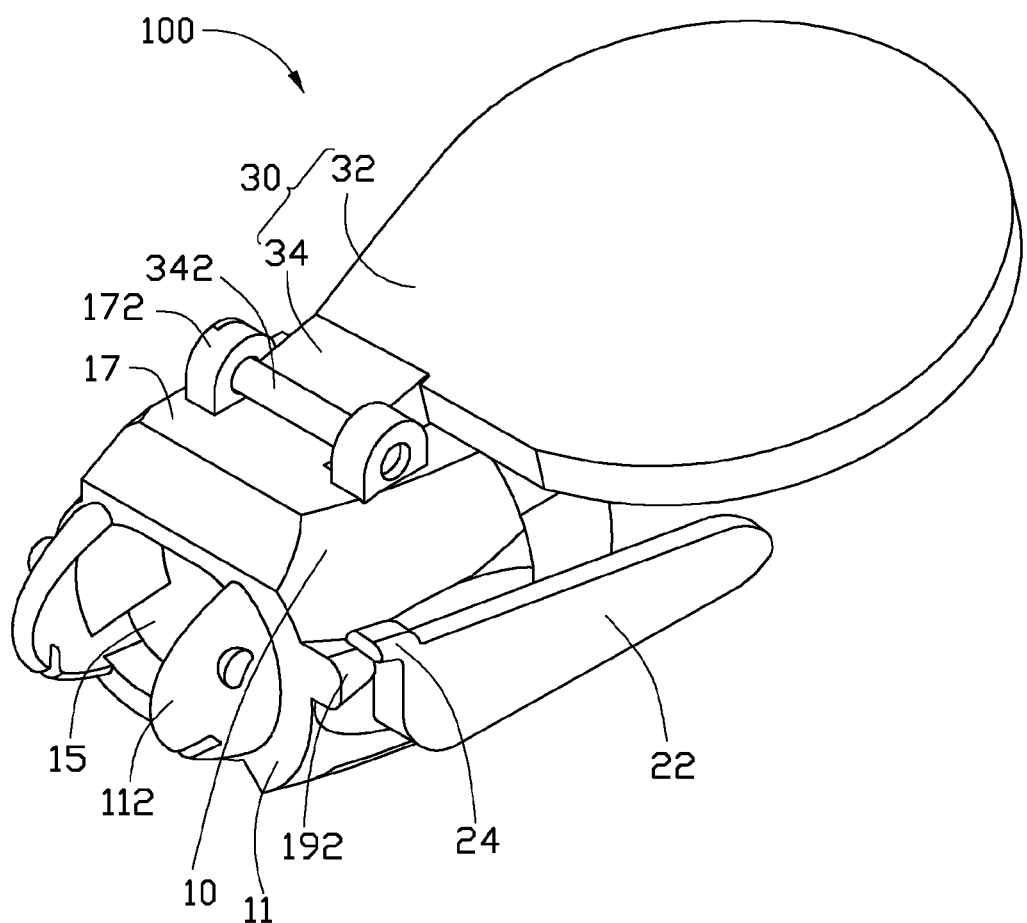
FIG. 1 is an integral schematic view of a stylus according to an exemplary embodiment.
Figure 2:
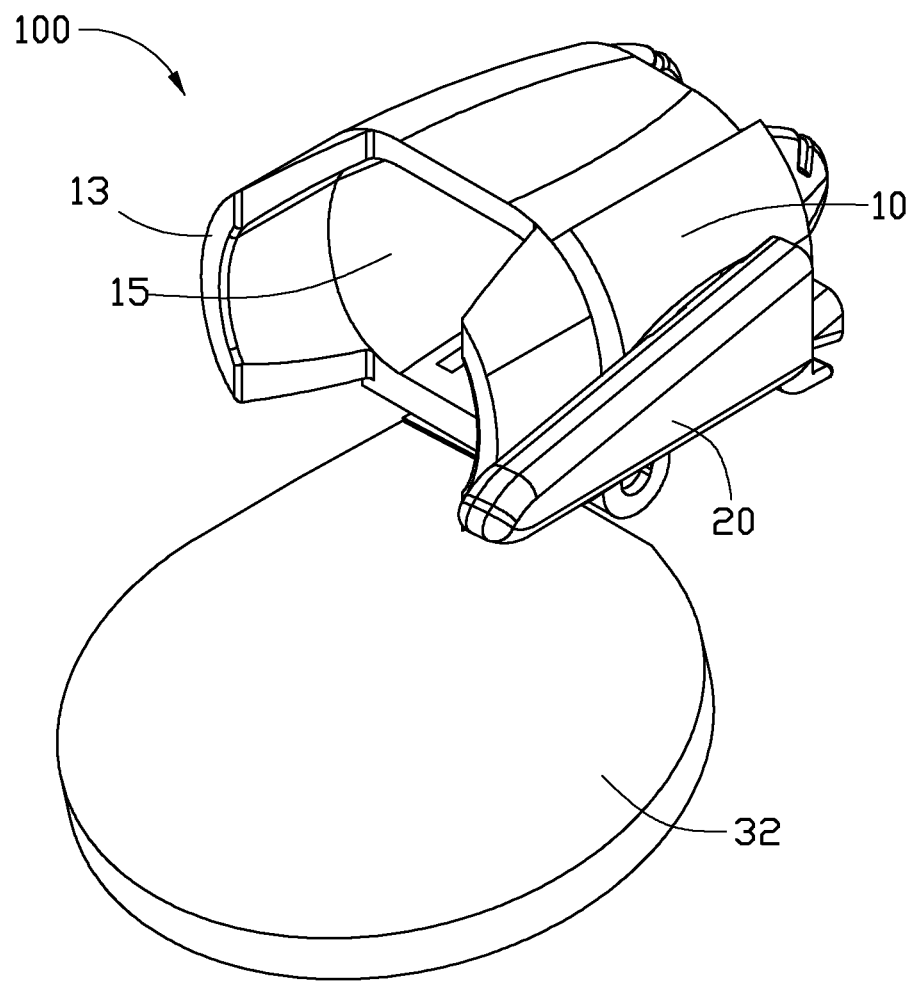
FIG. 2 is similar to FIG. 1, but viewed from another angle.

FIGS. 1, and 2 show an exemplary stylus 100 used as an input device for a touch screen of a portable electronic device.

The stylus 100 includes a main body 10, a nib 20, and a lens member 30. The nib 20 and the lens member 30 are rotatably connected to the main body 10.

The main body 10 is generally tubular and can be made of plastic materials such as Acrylonitrile Butadiene Styrene (ABS), or Polycarbonate (PC). The main body 10 includes a first end 11, an opposite second end 13, and a through hole 15 running through the first end 11 and the second end 13. The first end 11 extends to the second end 13 with a diameter gradually increasing to be the same as the through hole 15. The first end 11 has opposite decorative flanges 112 protruding from the end surface and extending along the extending direction of the main body 10. The second end 13 defines opposite cutouts 152 facilitating positioning of user's finger inserted into the through hole 15.

Figure 3:
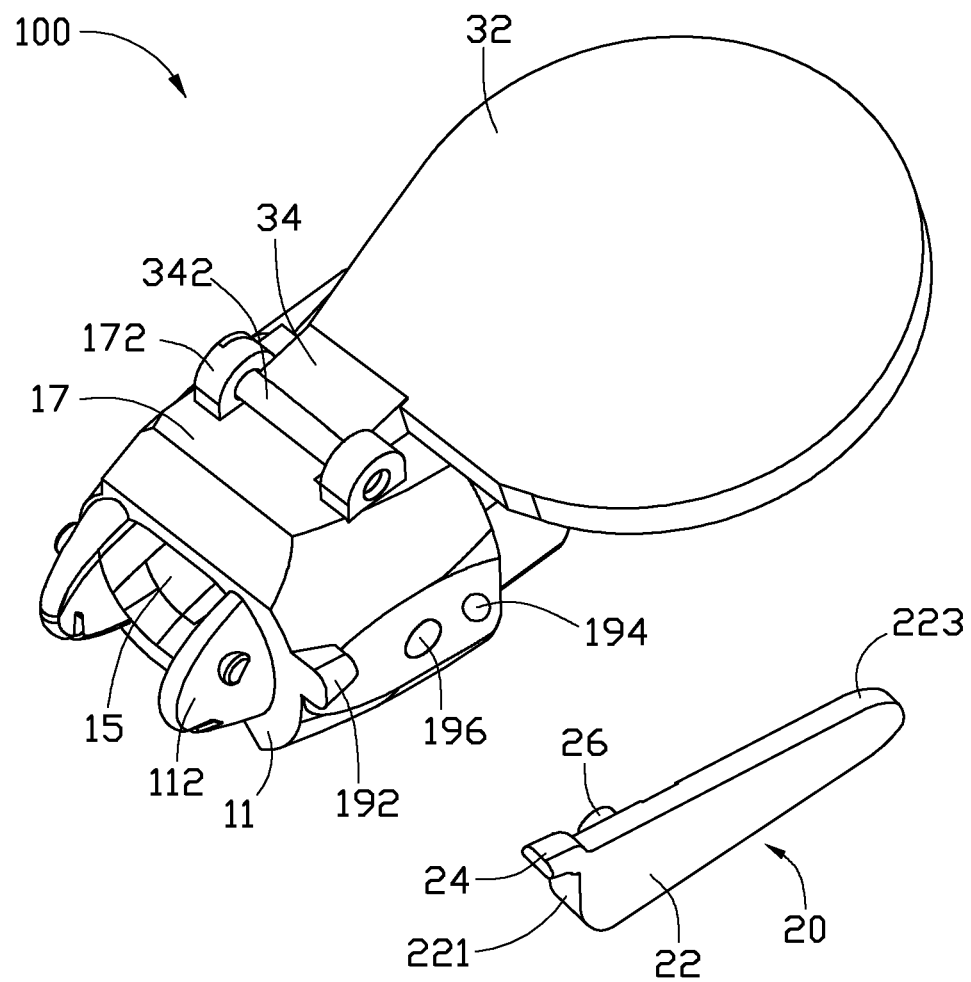
FIG. 3 is a partly exploded schematic view of the stylus shown in FIG. 1.

Referring further to FIG. 3, the main body 10 include a plane top surface 17 and a plane side surface 19 adjacent to the top surface 17. The top surface 17 has opposite connecting seats 172 arranged to rotatably connect to the lens member 30. A stopper 192 laterally protrudes from the side surface 19 adjacent to the first end 11 and an elastic embossment 194 protrudes from the side surface 19 adjacent to the second end 13. The stopper 192 is used to limit the rotation of the lens member 30, and the embossment 194 is to resist the nib 20 and maintain the nib 20 steadily relative to the main body 10. A connecting hole 196 is defined in the side surface 19 and between the stopper 192 and the embossment 194, and the nib 20 rotatably connects in the connecting hole 196.

The nib 20 can be made of elastic plastic materials such as Thermo Plastic Urethane (TPU). The nib 20 includes a nib base 22, a resisting rib 24 and a connecting post 26. The nib base 22 is generally bar shaped and includes an engagement end 221, and an opposite touching end 223. The engagement end 221 has an arced surface and the resisting rib 24 protrudes from the arced surface. The touching end 223 is used to touch the touch screen of the electronic device. The resisting rib 24 protrudes from the engagement end 221 and is used to engage with the stopper 192. The connecting post 26 laterally extends from an inner side surface of the nib base 22 and adjacent to the engagement end 221, approximately located at the central axis of the arced surface of the engagement end 221.

The lens member 30 includes a lens portion 32 and a hinge portion 34 integrally formed with the lens portion 32. The lens 32 can be a concave lens to act as a magnifying lens for users to better see characters on the display written using the nib. The hinge portion 34 is connected to a periphery of the lens portion 32 and includes a connecting shaft 342, and the connecting shaft 342 engages with the two connecting seats 172. Thus, the lens member 30 can rotate relative to the main body 10.

To assemble the stylus 100, the nib 20 is installed to the main body 10. The connecting post 26 is engaged into the connecting hole 196, and the resisting rib 24 abuts against the stopper 192. The embossment 194 resists against the inner side surface of the nib base 22. The lens member 30 is assembled in the main body 10, and the connecting shaft 342 is connected to the two connecting seats 172 to make the lens member 30 rotatably connected to the main body 10.

Figure 4:
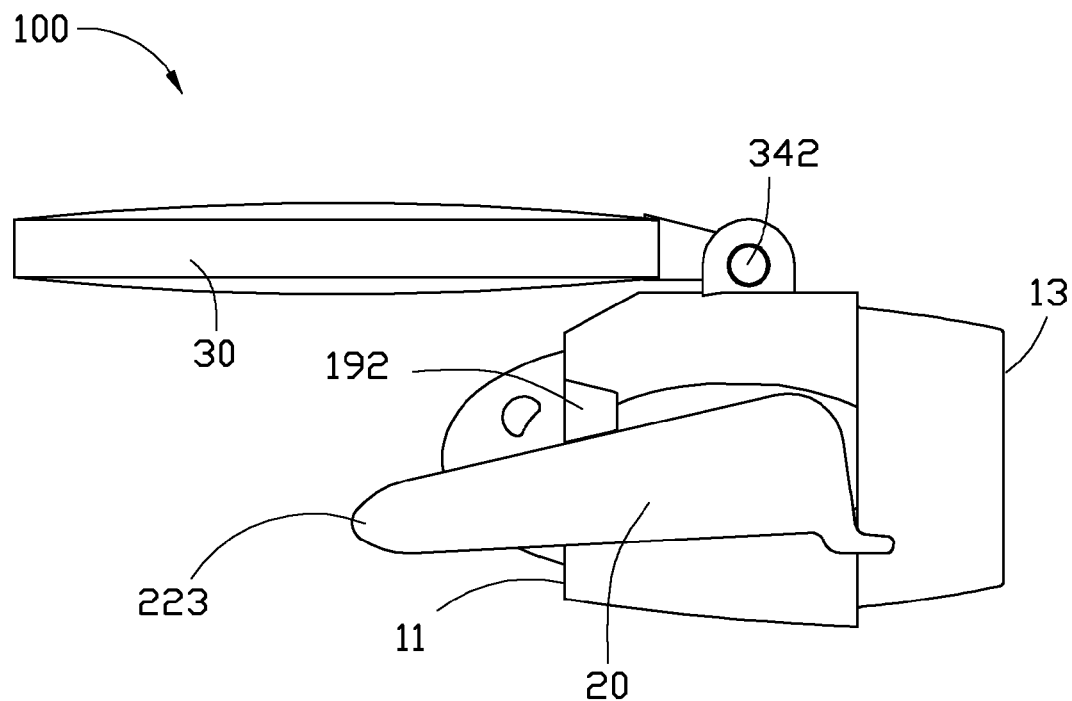
FIG. 4 is a side schematic view of the stylus shown in FIG. 1 when the stylus in use.

Referring to FIG. 4, when using the stylus 100, a user inserts their finger into the through hole 15 from the second end 13 to hold the main body 10. The nib 20 rotates about 180 degrees around the connecting post 26 until the nib base 22 resists against the stopper 192 and cannot rotate further. During the process of rotating, the embossment 194 invariably elastically resists the nib base 22. Thus, the touching end 223 of the nib base 22 extends from the first end 11 and can write on a screen. Then, the lens portion 32 is rotated about the connecting shaft 342 and shields the touching end 223 of the nib base 22. Therefore, the touching end 223 of the nib 22 can touch and write characters on the screen by manipulation of the finger. Meanwhile, the user can clearly see characters on the screen because of magnification by the lens 32, helping the user to have greater accuracy when using the stylus 100.

Figure 5:
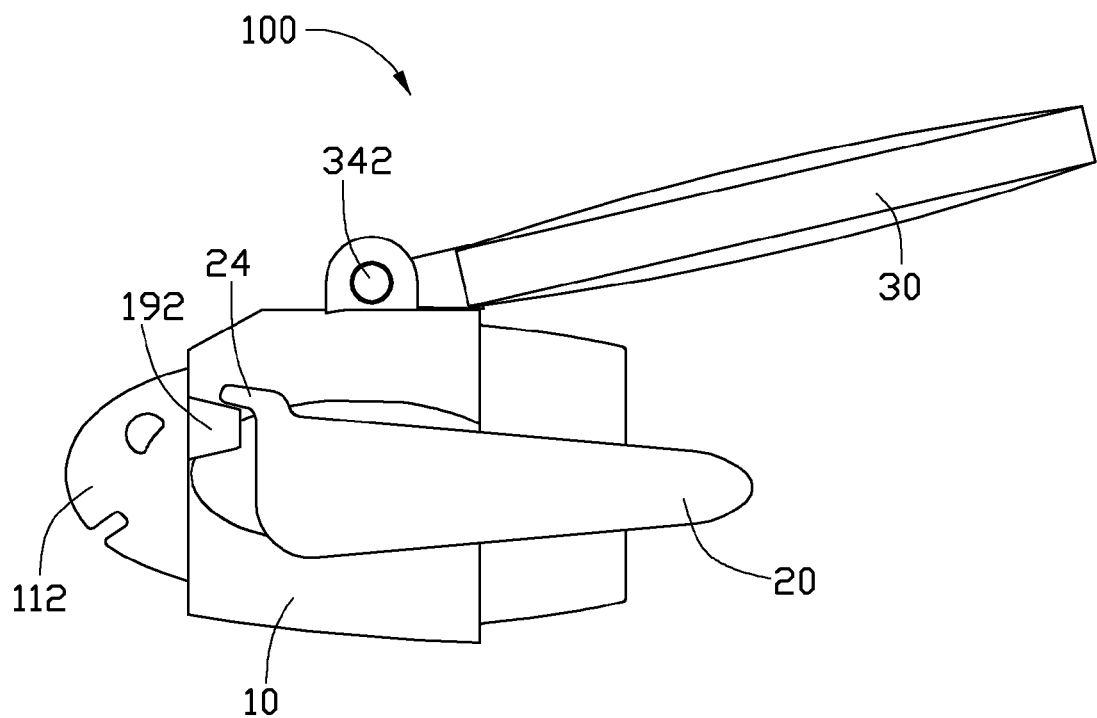
FIG. 5 is a side schematic view of the stylus shown in FIG. 1.

Referring to FIG. 5, after writing, the nib 20 and the lens member 30 can return to its original position by rotating the nib 20 and the lens member 30.

It is to be understood that even though numerous characteristics and advantages of the present exemplary embodiments have been set forth in the foregoing description, together with details of structures and functions of various embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A stylus for a portable electronic device, comprising:
   a main body having a through hole running through two ends thereof, a planar top surface, and a planar side surface adjacent to the top surface, the side surface including a stopper, a connecting hole, and an embossment, the connecting hole defined between the stopper and the embossment;
   a nib rotatably connected to the main body, the nib including a nib base, a resisting rib, and a connecting post, the resisting rib protruding from one end of the nib base, and the connecting post extending from an inner side surface of the nib base and adjacent to the stopper, the connecting post engaged into the connecting hole; and
   a lens member rotatably connected to the planar top surface;
   wherein the nib is rotated about 180 degrees around the connecting post until the resisting rib resists against the stopper and cannot rotate further, the embossment invariably elastically resists the nib base for holding the nib base in any position.

2. The stylus as claimed in claim 1, wherein the main body includes a first end and an opposite second end, the first end extends to the second end with a diameter gradually increasing to be the same size as the diameter of the through hole.

3. The stylus as claimed in claim 2, wherein the first end has opposite decorative flanges protruding from the end surface and extending along the extending direction of the main body.

4. The stylus as claimed in claim 2, wherein the second end defines opposite cutouts.

5. The stylus as claimed in claim 1, wherein the planar top surface have two connecting seats arranged thereon, the lens member includes a hinge portion having a connecting shaft to hinge with the two connecting seats.

6. The stylus as claimed in claim 1, wherein nib base includes an engagement end and a touching end, the engagement end is arced and has the resisting rib protruding thereform, the touching end is used to write.

7. The stylus as claimed in claim 1, wherein the lens member includes a lens portion, the lens portion is a concave lens to act as a magnifying lens.

\* \* \* \* \*